(12) United States Patent
Shani et al.

(10) Patent No.: US 11,016,867 B2
(45) Date of Patent: *May 25, 2021

(54) TEST EXECUTION COMPARISONS

(71) Applicant: MICRO FOCUS LLC, Santa Clara, CA (US)

(72) Inventors: Inbar Shani, Yehud (IL); Amichai Nitsan, Yehud (IL); Yaron Burg, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/061,118

(22) PCT Filed: Dec. 18, 2015

(86) PCT No.: PCT/US2015/066543
§ 371 (c)(1),
(2) Date: Jun. 11, 2018

(87) PCT Pub. No.: WO2017/105473
PCT Pub. Date: Jun. 22, 2017

(65) Prior Publication Data
US 2018/0365123 A1   Dec. 20, 2018

(51) Int. Cl.
*G06F 11/32* (2006.01)
*G06F 11/36* (2006.01)
(Continued)

(52) U.S. Cl.
CPC .......... *G06F 11/323* (2013.01); *G06F 11/26* (2013.01); *G06F 11/3466* (2013.01);
(Continued)

(58) Field of Classification Search
CPC ............ G06F 11/3688; G06F 11/3692; G06F 11/3664; G06F 11/3672
See application file for complete search history.

(56) References Cited

U.S. PATENT DOCUMENTS 8,185,877 B1 * 5/2012 Colcord .................. G06F 9/44
717/124
8,745,586 B1   6/2014 Boissy
(Continued)

OTHER PUBLICATIONS

Farah, A., et al., Trace Comparison Using a Sequence Alignment Algorithm, Aug. 24, 2015, WSPPD 2015, pp. 17-20.
(Continued)

*Primary Examiner* — Jigar P Patel

(57) ABSTRACT

Example implementations relate to test execution comparisons. Some implementations may include a data capture engine to capture data points during test executions of the application under test. The data points may include, for example, test action data and application action data. Additionally, some implementations may include a data correlation engine to correlate each of the data points with a particular test execution of the test executions, and each of the data points may be correlated based on a sequence of events that occurred during the particular test execution. Furthermore, some implementations may also automatically compare the test executions, based on the correlated data points, to identify commonalities.

15 Claims, 9 Drawing Sheets

(51) Int. Cl.
  *G06F 11/26* (2006.01)
  *G06F 11/34* (2006.01)
(52) U.S. Cl.
  CPC ...... *G06F 11/3664* (2013.01); *G06F 11/3672* (2013.01); *G06F 11/3688* (2013.01); *G06F 11/3692* (2013.01)

(56) References Cited

U.S. PATENT DOCUMENTS

| | | |
|---|---|---|
| 8,996,988 B2 | 3/2015 | Yee |
| 9,069,967 B2 | 6/2015 | Wysopal et al. |
| 2002/0166081 A1 | 11/2002 | Richardson |
| 2003/0220984 A1* | 11/2003 | Jones ................ H04L 41/0896 709/219 |
| 2006/0083179 A1 | 4/2006 | Mitchell |
| 2011/0004868 A1 | 1/2011 | Bharadwaj |
| 2011/0106944 A1 | 5/2011 | De Pauw |
| 2011/0145653 A1 | 6/2011 | Broadfoot et al. |
| 2013/0167113 A1 | 6/2013 | Mahmud |
| 2013/0174178 A1* | 7/2013 | Chakraborty ....... G06F 11/3672 718/105 |
| 2014/0164376 A1* | 6/2014 | Yang .................... G06F 16/355 707/737 |
| 2014/0189652 A1 | 7/2014 | Gounares |
| 2014/0230062 A1* | 8/2014 | Kumaran ............ H04L 63/1408 726/24 |
| 2015/0356147 A1* | 12/2015 | Mishra .............. G06F 16/24575 707/693 |
| 2017/0083815 A1* | 3/2017 | Sanchez Charles .. G06F 21/552 |

OTHER PUBLICATIONS

International Searching Authority, International Search Report and Written Opinion dated Aug. 24, 2016 for PCT Application No. PCT/US/2015/066543 Filed Dec. 18, 2015, 12 pages.

* cited by examiner

TEST EXECUTION COMPARISONS

BACKGROUND

Application testing may be performed to provide information about an application under test ("AUT"). For example, application testing may be performed to determine whether the AUT includes any errors or other defects. While various techniques are available for application testing, basic application testing procedures may involve two main types of test steps: (1) action steps which manipulate, drive, or query an application under test ("AUT"); and (2) verification steps which verify the expected outcomes associated with the action steps.

BRIEF DESCRIPTION OF THE DRAWINGS

The following detailed description references the drawings, wherein.

DETAILED DESCRIPTION

Figure 1:
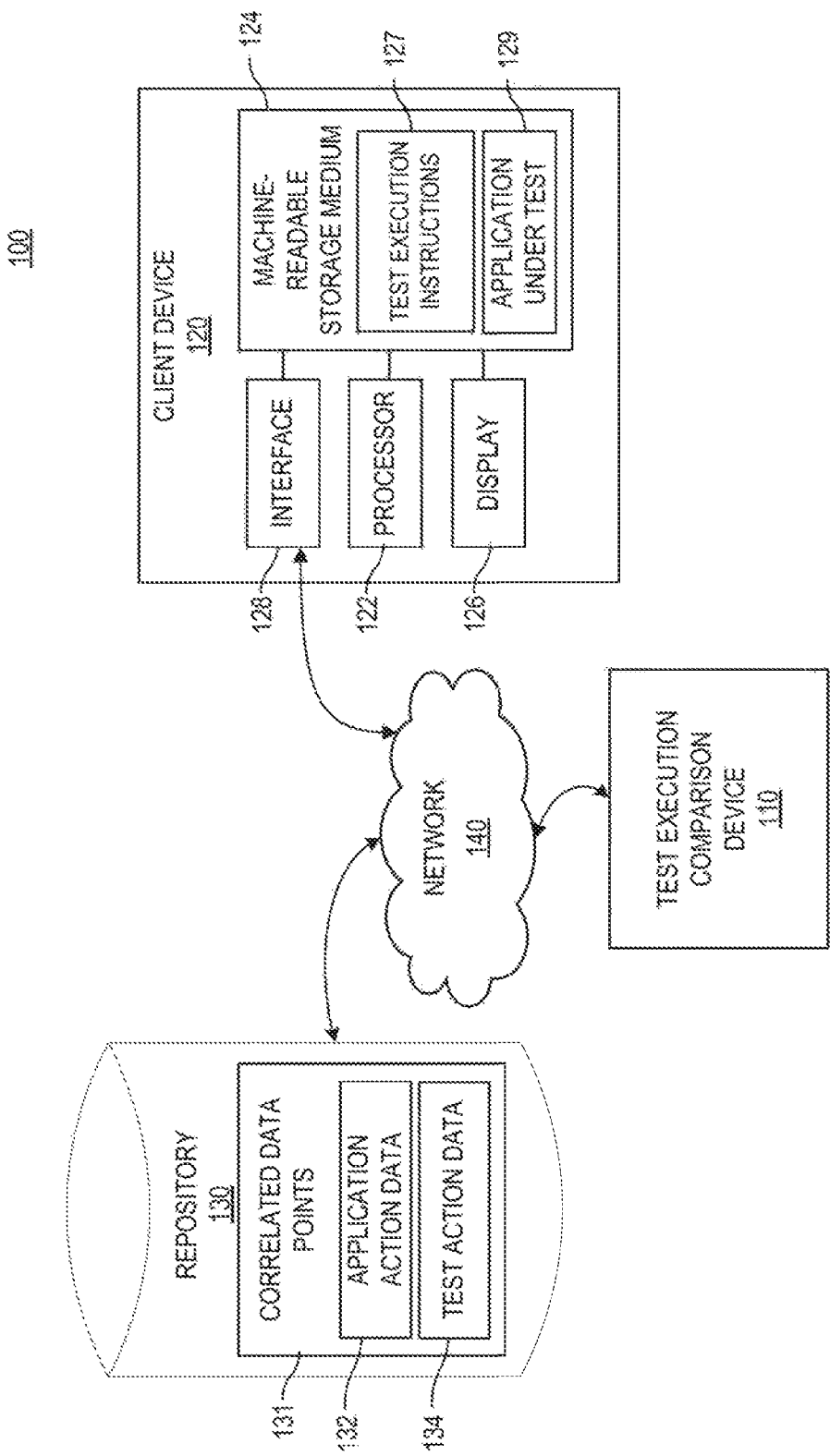
FIG. 1 is a block diagram of an example system for test execution comparisons consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, test executions may be performed to provide information about an AUT. In some circumstances, there may be cause to compare test executions, such as to identify root causes of issues by comparing successful test executions with failures, to remove the redundancy of tests covering the same functionality, to map manual test steps to automated ones in order to automate an end-to-end low, and the like. However, when comparing test executions (either different executions of the same test or executions of different tests) there may be challenges in deciding which test steps are actually conceptually similar such that they should be compared to each other. For example, test executions of what appear to be the same test may actually be different due to changes to the test, the AUT, or the environment of the AUT. Accordingly, making comparisons between test executions manually can be quite difficult.

Examples disclosed herein may provide test execution comparisons. To this end, some examples may capture data points during test executions of an AUT, correlate each of the data points with a particular test execution, and automatically compare the test executions, based on the correlated data points, to identify commonalties. For example, the automatic comparison may identify commonalities between different executions of the same test or between executions of different tests.

Referring now to the drawings, FIG. 1 is a block diagram of an example system 100 for test execution comparisons consistent with disclosed implementations. System 100 may be implemented in a number of different configurations without departing from the scope of the disclosed examples. In the example shown in FIG. 1, system 100 may include a test execution comparison device 110, a client device 120, a repository 130, and a network 140 for connecting test execution comparison device 110 with client device 120 and/or repository 130.

Test execution comparison device 110 may be a computing system that performs various functions consistent with disclosed examples. For example, test execution comparison device 110 may be a server, a desktop computer, a laptop computer, and/or any other suitable type of computing device, in some examples, test execution comparison device 110 may process information received from client device 120 and/or repository 130. For example, test execution comparison device 110 may automatically compare test executions to identify commonalities (e.g., shared features and/or attributes) based on data captured from client device 120 and/or received from repository 130. Examples of test execution comparison device 110 and certain functions that may be performed by device 110 are described in greater detail below with respect to, for example, FIGS. 2-11.

Client device 120 may be a computing system operated by a user. For example, client device 120 may be a desktop computer, a laptop computer, a tablet computing device; a mobile phone, and/or any other suitable type of computing device. In some examples, client device 120 may be a computing device to perform operations consistent with certain disclosed implementations. For example, client device 120 may be adapted to transmit data related to test executions of an AUT to test execution comparison device 110.

Client device 120 may include a processor to execute instructions stored in a machine-readable storage medium, in the example shown in FIG. 1, client device 120 may include a processor 122, a machine-readable storage medium 124, a display device 128, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124

(such as test execution instructions 127 (e.g., instructions related to a particular test execution) and/or AUT instructions 129 (e.g., instructions related to the AUT)) to test an AUT. While in the example shown in FIG. 1 the AUT resides on client device 120, test execution instructions 127 and/or AUT instructions 129 may reside on different machines and/or may span multiple computing systems. Machine-readable storage medium 124 may be any electronic, magnetic, optical, or other non-transitory storage device that stores instructions executed by processor 122. Display 128 may be any type of display device that presents Information, such as a user interface of an AUT, a test execution comparison visualization, and the like, to a user (e.g., a tester) operating client device 120. Interface 128 may be any combination of hardware and/or programming that facilitates the exchange of data between the Internal components of client device 120 and external components, such as test execution comparison device 110. In some examples, interface 128 may include a network interface device that allows client device 120 to receive and send data to and from various components, such as to and from test execution comparison device 110 via network 140.

Repository 130 may be any type of storage system configuration that facilitates fie storage of data. In some implementations, repository 130 may facilitate the locating, accessing, and retrieving of data points captured during test executions of an AUT (e.g., SaaS, SQL, Access, etc. databases). For example, repository 130 may store correlated data points 131, which may include application action data 132 and test action data 134 (described in further detail below). While in the example shown in FIG. 1 the correlated data points 131 reside in repository 130, any portion of the correlated data points 131 may reside on different storage systems.

Repository 130 can be populated by a number of methods, for example, test execution comparison device 110 may populate repository 130 with data points captured and correlated by test execution comparison device 110, and store the correlated data points 131 in repository 130. In some implementations, the data points may be stored as a directed acyclic graph ("DAG"). Traditionally, a DAG is a directed graph formed by a collection of vertices (e.g., a fundamental unit of which the graph is formed) and directed edges (e.g., an edge that points from a first vertex in the collection of vertices to a second vertex in the collection of vertices). A DAG, as used herein, doesn't necessarily mean a graphic representation of the data included in a traditional DAG. Instead, a DAG as used herein may Include the graphic representation and/or a data structure that stores the data points in a manner that allows system 100 to determine data represented by the traditional DAG (e.g., categorization of the data points, directed edges associated with particular data points, and/or vertices associated with the data points). In some examples, the data structure may be an array, a record, a database entry, a lookup table, a hash table, a map, a tree, a linked list, and/or any other type of data structure. An example of a DAG consistent with disclosed implementations is discussed in more detail below with respect to, for example, FIG. 5.

While in the example shown in FIG. 1 repository 130 is a single component external to components 110 and 120, repository 130 may comprise separate components and/or may be part of devices 110, 120, and/or another device. In some implementations, repository 130 may be managed by components of device 110 and/or other devices that are capable of accessing, creating, controlling and/or otherwise managing data remotely through network 140.

Network 140 may be any type of network that facilitates communication between remote components, such as test execution comparison device 110 and client device 120, For example, network 140 may be a local area network (LAN), a wide area network (WAN), a virtual private network, a dedicated intranet, the internet, and/or a wireless network.

The arrangement illustrated in FIG. 1 is simply an example, and system 100 may be implemented in a number of different configurations. For example, while FIG. 1 shows one test execution comparison device 110, client device 120, repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1).

Figure 2:
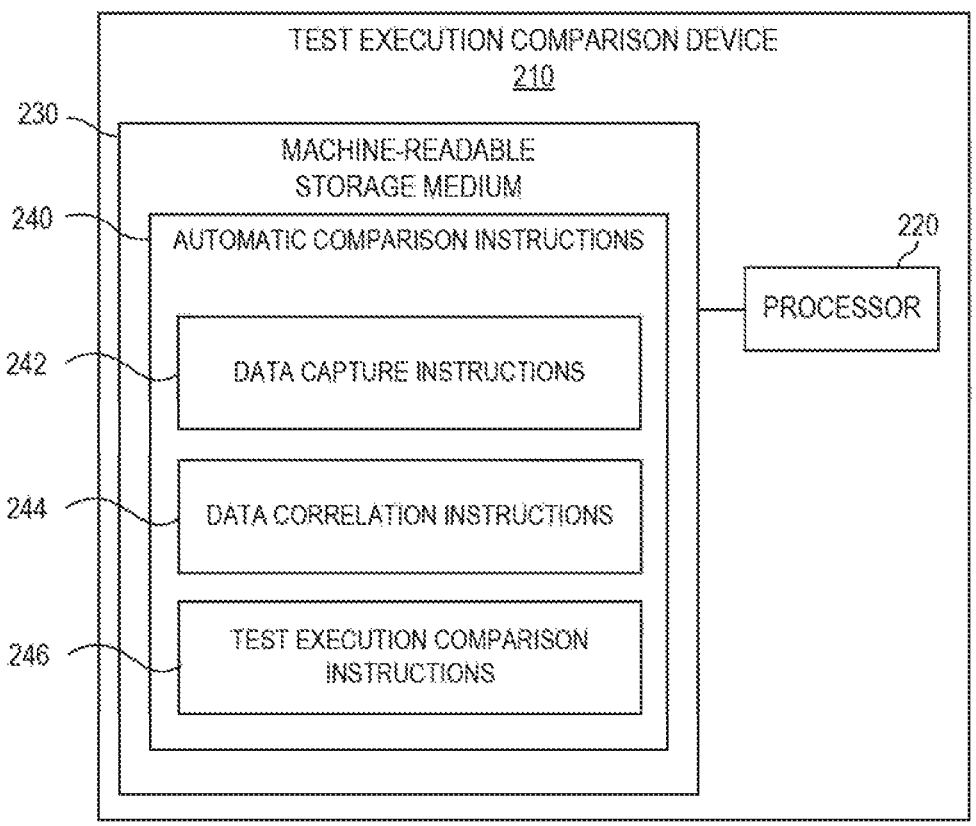
FIG. 2 is a block diagram of an example test execution comparison device consistent with disclosed implementations.

FIG. 2 is a block diagram of an example test execution comparison device 210 consistent with disclosed implementations. In certain aspects, test execution comparison device 210 may correspond to test execution comparison device 110 of FIG. 1. Test execution comparison device 210 may be implemented in various ways. For example, device 210 may be a special purpose computer, a server, a mainframe computer, and/or any other suitable type of computing device. In the example shown in FIG. 2, test execution comparison device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute automatic comparison instructions 240 (e.g., instructions 242, 244, and/or 246) stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium, where the term "non-transitory" does not encompass transitory propagating signals. Machine-readable storage medium 230 may be encoded with instructions that, when executed by processor 220, perform operations consistent with disclosed implementations. For example, machine-readable storage medium 230 may include instructions that perform operations for test execution comparisons by capturing data points during test executions of an AUT, correlating each of the data points with a particular test execution of the AUT, and automatically comparing the test executions, based on the correlated data points, to identify commonalities. In the example shown in FIG. 2, machine-readable storage medium 230 may include data capture instructions 242, data correlation instructions 244, and test execution comparison instructions 246.

Data capture instructions 242 may function to capture data points during test executions of an AUT. In some implementations, when data capture instructions 242 are executed by processor 220, data capture instructions 242 may cause processor 220 and/or another processor to capture data points during test executions of the AUT, For example, data capture instructions 242 may cause processor 220 and/or another processor to access, receive, or otherwise obtain the data points from one or more computing systems that execute the test and/or implement the AUT during the test executions. In some examples, the data points may be captured by installing agents on various physical or virtual system components to monitor how the particular component(s) function and to transmit the data points to a storage device, such as a storage device associated with test execution comparison device 110. The transmitted data points may then be received and/or captured by test execution comparison device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component's memory usage.

In some implementations, the captured data points may include application action data that includes data related to actions performed by the application under test in response to test actions performed during the test executions, the application action data may include data related to various levels of the AUT, such as a user interface level (e.g., UI snapshots, UI object extractions, etc.), a code level (e.g., code executed behind the UI), a network communication level (e.g., network communications between client device 120 and test execution comparison device 110), a database level (e.g., databases accessed by the AUT during test execution), and an environment level (e.g., data related to the environment of the AUT such as data related to hardware (e.g., device build, CPU usage, memory usage, resource usage, etc.) and programming (e.g., operating system, browser, etc.) that are related to the execution of the test of the AUT (e.g., server logs) and/or that relate to the execution of the AUT itself (e.g., application server errors)). In some examples, the captured data points may include test action data that includes data related to the test actions performed during the test executions, such as test actions and/or steps performed during the particular test execution (e.g., start test step (e.g., data indicating that the data point is related to the start of a test step), end test step (e.g., data indicating that the data point is related to the end of a test step), report test result step (e.g., data indicating that the data point is related to a particular result of a test step), complete test step (e.g., data indicating that the data point is related to the completion of an entire test), and/or a report test step (e.g., data indicating that the data point relates to reporting the results on the entire test)), and/or metadata related to the AUT (e.g., AUT version), the particular test execution state (e.g., test date/time, tester name, etc.), and the like. Examples of capturing data points during test executions of an AUT are described in further detail below with respect to, for example, FIGS. 2, 3, 5, and 6.

Data correlation instructions 244 may function to correlate data points. For example, when data correlation instructions 244 are executed by processor 220, data correlation instructions 244 may cause processor 220 to correlate each of the data points with a particular test execution of the AUT. In some implementations, the data points may be correlated based on a sequence of events that occurred during the particular test execution. For example, data correlation instructions 244 may cause processor 220 to generate a DAG and/or store the data in a manner that allows verification queries of the data. In some examples, the DAG and/or the correlated data points may be stored in a repository, such as repository 130. Examples of correlating data points are described in further detail below with respect to, for example, FIGS. 4 and 5.

Test execution comparison instructions 246 may function to compare the test executions, based on the correlated data points, to identify commonalities. For example, when test execution comparison instructions 246 are executed by processor 220, test execution comparison instructions 246 may cause processor 220 to compare the test executions by generating string representations of each of the DAGs, identifying a longest common subsequence of the string representations, determining a level of similarity between the test executions based on the longest common subsequence, and mapping the longest common subsequence back to a subset of backbone nodes. Examples of automatically comparing the text executions to identify commonalities are described in further detail below with respect to, for example, FIGS. 2-11.

Figure 3:
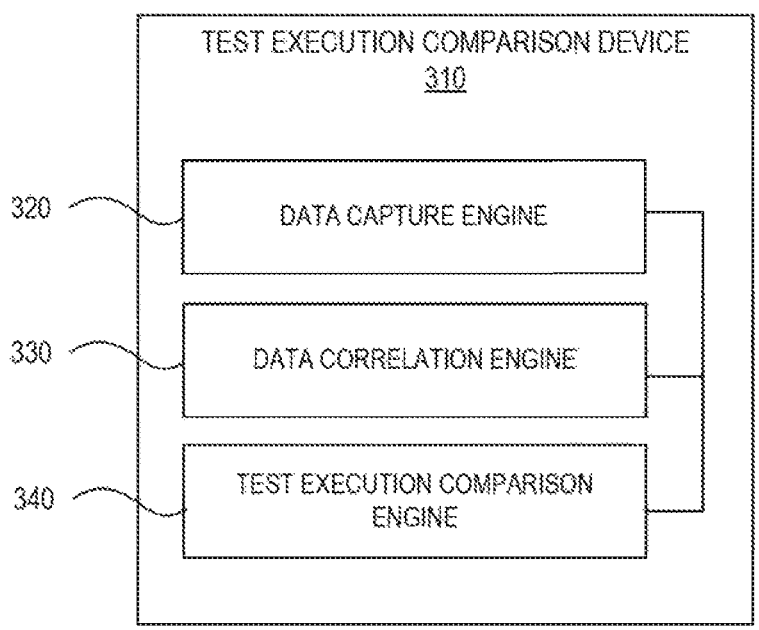
FIG. 3 is a block diagram of an example test execution comparison device consistent with disclosed implementations.

FIG. 3 is a block diagram of an example test execution comparison device 310 consistent with disclosed implementations. In certain aspects, test execution comparison device 310 may correspond to test execution comparison device 110 of FIG. 1 and/or test execution comparison device 210 of FIG. 2, Device 310 may be implemented in various ways. For example, device 310 may be a special purpose computer, a server, a mainframe computer, and/or any other suitable type of computing system. In the example shown in FIG. 3, device 310 may include a data capture engine 320, a data correlation engine 330, and a test execution comparison engine 340.

Engines 320, 330, and 340 may be electronic circuitry for implementing functionality consistent with disclosed examples. For example, engines 320, 330, and 340 may represent combinations of hardware devices and programming to implement functionality consistent with disclosed implementations. In some examples, the functionality of engines 320, 330, and/or 340 may correspond to operations performed by test execution comparison device 210 of FIG. 2, such as operations performed when automatic comparison instructions 240 are executed by processor 220 (described above with respect to FIG. 2). In FIG. 3, data capture engine 320 may represent a combination of hardware and programming that performs operations similar to those performed when processor 220 executes data capture instructions 242. Similarly, data correlation engine 330 may represent a combination of hardware and programming that performs operations similar to those performed when processor 220 executes data correlation instructions 244, and test execution comparison engine 340 may represent a combination of hardware and programming that performs operations similar to those performed when processor 220 executes test execution comparison instructions 248.

Figure 4:
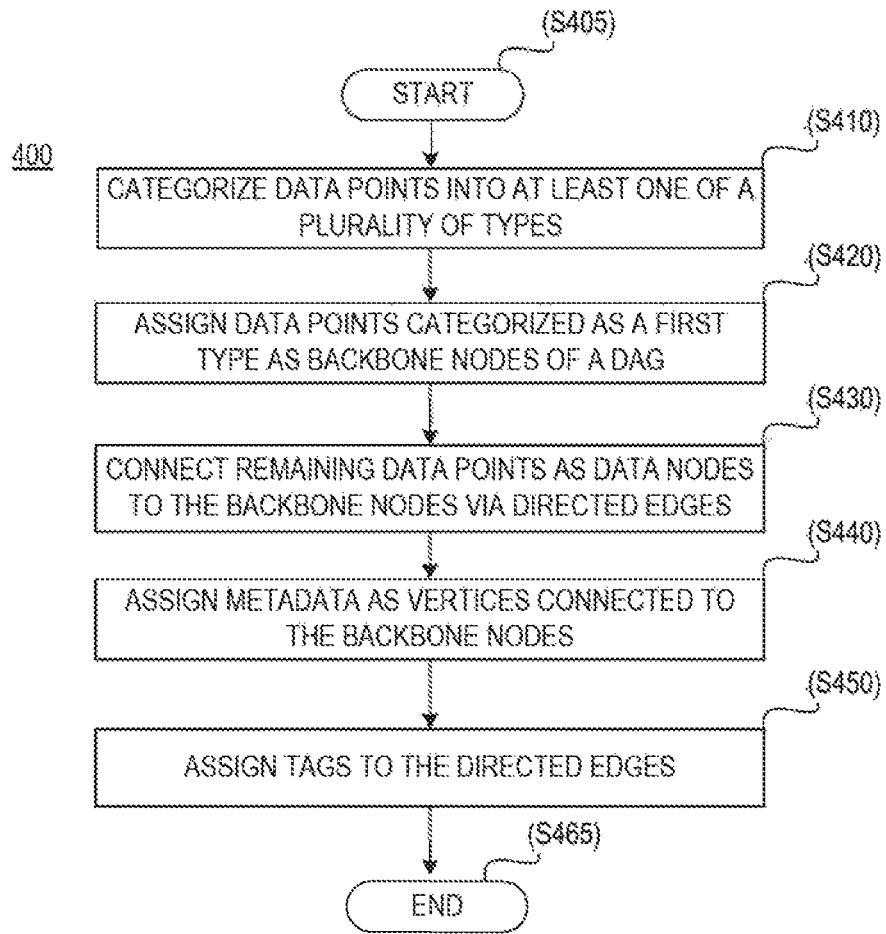
FIG. 4 is a flow chart of an example process for correlating data points consistent with disclosed implementations.

FIG. 4 is a flow chart of an example process 400 for correlating data points consistent with disclosed implementations. Although execution of process 400 is described below with reference to system 100 of FIG. 1 and/or specific components of system 100, other suitable systems and devices for execution of at least one step of process 400 may be used. For example, processes described below as being performed by test execution comparison device 110 may be performed by test execution comparison device 210, test execution comparison device 310, and/or any other suitable device. Process 400 may be implemented in the form of executable instructions stored on a machine-readable storage medium and/or in the form of electronic circuitry.

Process 400 may start (step S405) after data points have been captured during test executions of an AUT. Once the data points have been captured, process 400 may function to correlate each of the data points by categorizing each of the data points into at least one of a plurality of types. In some implementations, the at least one of the plurality of types may include a first type (e.g., test steps). For example, the data points may be correlated by generating a DAG, such as DAG 500 of FIG. 5. In some implementations, the DAG may be generated based on timestamps associated with the data points. For example, process 400 may include categorizing the data points unto at least one of a plurality of types (step S410). For example, the data points may be categorized based on steps of the test execution, data type (e.g., CPU, memory, UI object, user action, network packet, etc.), a particular user (e.g., an identify of the user who was running the test), AUT build (the specific build version of the AUT when the data points were captured), and/or any other suitable categorization. In some implementations, the plurality of types may include a first type. For example, the first type may be test actions of the test execution such as, for example, steps involved in tester interaction with a user interface of the AUT. As another example, the first type may be application actions of the test execution such as, for example, actions of the AUT that are performed in response to the test actions. The definition of the particular types may be predetermined, or may be based on input from a user. For example, a user may define the application action type as all actions completed by the AUT between a test action and a fell update to a user interface (e.g., may transmit the user Interface has been updated such that all of the text and/or graphics have fully loaded) of the AUT.

Process 400 may also include assigning data points categorized as the first type as backbone nodes of a DAG (step S420). For example, system 100 may assign the data points associated with test steps of the test execution as a backbone (e.g., a plurality of backbone nodes) of the DAG. Thus, in some implementations, the data points associated with test steps may be considered to be backbone nodes, and the remaining data points (e.g. data points associated with application actions) may be considered to be data nodes.

Process 400 may also include connecting remaining data points (e.g., a set of the data points that are not categorized as the first type) as data nodes to the backbone nodes via directed edges based on timestamps associated with the remaining data points (step S430). For example, the data points may be connected via directed edges from a first data point of the first type (e.g., a first test step of the test steps). In some examples, the data points may be connected based on a length of time between a time stamp associated with a particular data point of the captured data points, and a time stamp associated with the first test step. For example, system 100 may order the test steps in the backbone sequentially based on when the test steps were executed. Events associated with a particular test step may be traced and associated with the particular test step. For example, system 100 may trace UI objects. A UI scanner may run periodically and automatically identify structured objects in the UI, their attributes, and their values. As another example, system 100 may trace system events associated with a particular test steps by implementing a thread event monitor that monitors threads for a creation of an object, the run of an object, the termination of an object, and the like, and associate the creation, run, and/or termination of objects to a particular test event based on thread and object identifiers.

Process 400 may also include assigning the metadata as vertices connected to the backbone nodes (step S440). For example, system 100 may determine the elements of the backbone and may assign metadata (e.g., data points) traced to each particular element (e.g., each test step). For example, system 100 may trace the metadata based on time-relations (e.g., the event happened after a particular test step) or based on another suitable methodology (e.g., coloring network packets to trace them to a server code).

Process 400 may also include assigning tags to the directed edges to identify a type of relation between the vertices (step S450). In some implementations, system 100 may assign tags to the directed edges based on data received from the agents installed on the various physical or virtual system components. For example, the agents may Include instructions, that when executed by a processor, compere an event occurring with the system to a list of rules. If the event matches a particular rule, the agent notes the tag association between events. For example, assume that the list of rules includes a use tagging rule that requires tagging a directed edge as "use" when a test step involves the usage of a browser. When a test step is executed that invokes an object named "browser," the agent may compare the invocation of the object to the list of rules and, based on the use tagging rule in the list, tag the directed edge as "use." After the data points have been categorized (step S410), the data points have been assigned (step S420), the remaining data; points have been connected (step S430), the metadata has been assigned as vertices (step S440), the tags have been assigned to directed edges (step S450), and/or the DAG has been stored (step S480), process 400 may end (step S465). In some implementations, the DAG generated by process 400 may be stored in a storage device. For example, the DAG may be stored in a storage device such as a non-transitory computer-readable storage medium (e.g. a machine-readable storage medium in test execution comparison device 110, repository 130, and/or in another device).

Figure 5:
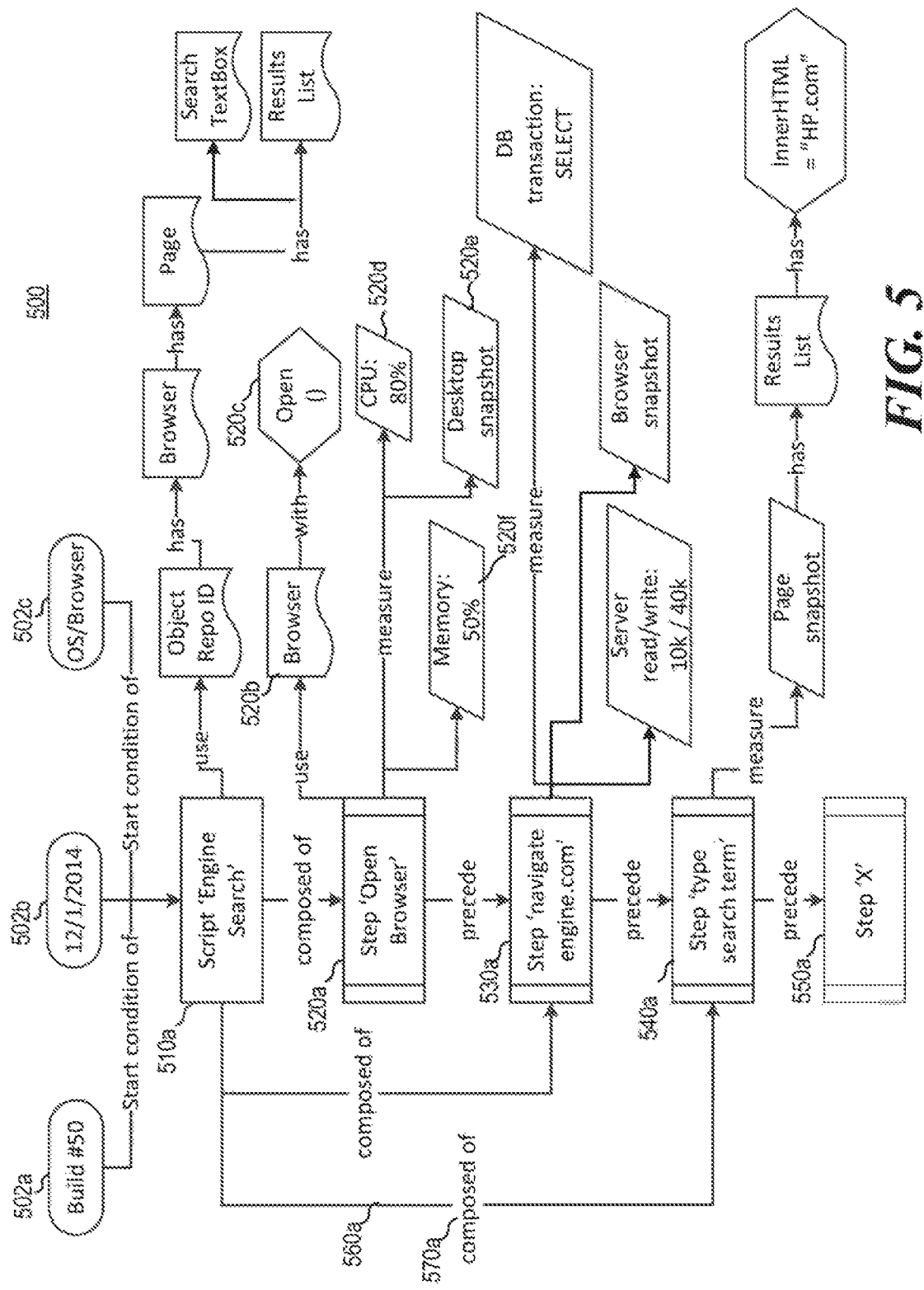
FIG. 5 is an example of a block diagram of an example directed acyclic graph ("DAG") consistent with disclosed implementations.

FIG. 5 is an example of a block diagram of a DAG 500 consistent with disclosed implementations. For example, DAG 500 may represent data points captured during test executions of an AUT that have been correlated based on a sequence of events that occurred during a particular test execution. Although the example DAG 500 is described below as being managed by, updated by, and/or otherwise utilized by system 100 of FIG. 1 and/or specific components of system 100, other suitable systems and devices for managing, updating, and/or otherwise utilizing DAG 500 may be used. For example, processes described below as being performed by test execution comparison device 110 may be performed by test execution comparison device 210, test execution comparison device 310, and/or any other suitable device. Processes performed with respect to DAG 500 may be implemented in the form of executable instructions stored on a machine-readable storage medium and/or by electronic circuitry As shown in FIG. 5, DAG 500 may include data related to one or more particular test executions of an AUT. As shown in FIG. 5, the data includes data points related to application data 502*a* (e.g., build number), test data (e.g., the date of the test) 502*b*, and environment data 502*c* (e.g., operating system and browser type). DAG 500 also includes a backbone (the collective of test steps 510*a*, 520*a*, 530*a*, 540*a*, and 550*a*) which serves as the anchor for each of the vertices in the DAG. In some implementations, each data point may be considered to be a node within the DAG and may be classified based on the categorization of the particular data points (e.g., a backbone node (e.g., a test action node), an application action node, and the like). In this example, the backbone is comprised of test steps performed during test executions of the AUT, but DAGs consistent with disclosed implementations may use any suitable categorization of the data points as the backbone. For example, the backbone may be comprised according to user actions, recorded AUT web pages, UI objects, and/or any other suitable categorization.

The backbone of DAG 500 is correlated based on a sequence of events that occurred during the particular test execution, and thus the backbone links various ones of test steps 510*a*, 520*a*, 530*a*, 540*a*, and 550*a* together. In the example shown in FIG. 5, test step 510*a* occurred before test step 520*a*, test step 520*a* occurred before test step 530*a*, test step 530*a* occurred before test step 540*a*, and test step 540*a* occurred before test step S550*a*. Each portion of the backbone (e.g., each test step) in this example is connected via directed edges (only directed edge 560*a* has been labelled for clarity) from the first test step 510*a* of the test steps to the last test step 550*a* of the test steps, and the directed edges have been tagged (only tag 570*a* has been labelled for clarity) to identify a type of relation between the vertices. For example, test step 510*a* is directly linked with test steps 520*a*, 530*a*, and 540*a* via the directed edges, and the cause and/or effect of the linkage is shown in the tagging. For example, test step 510*a* is composed of test steps 520*a*, 530*a*, and 540*a*, test step 520*a* precedes test step 530*a*, test step 530*a* precedes test step 540*a*, and test step 550*a* precedes test step 540*a*.

Figure 6:
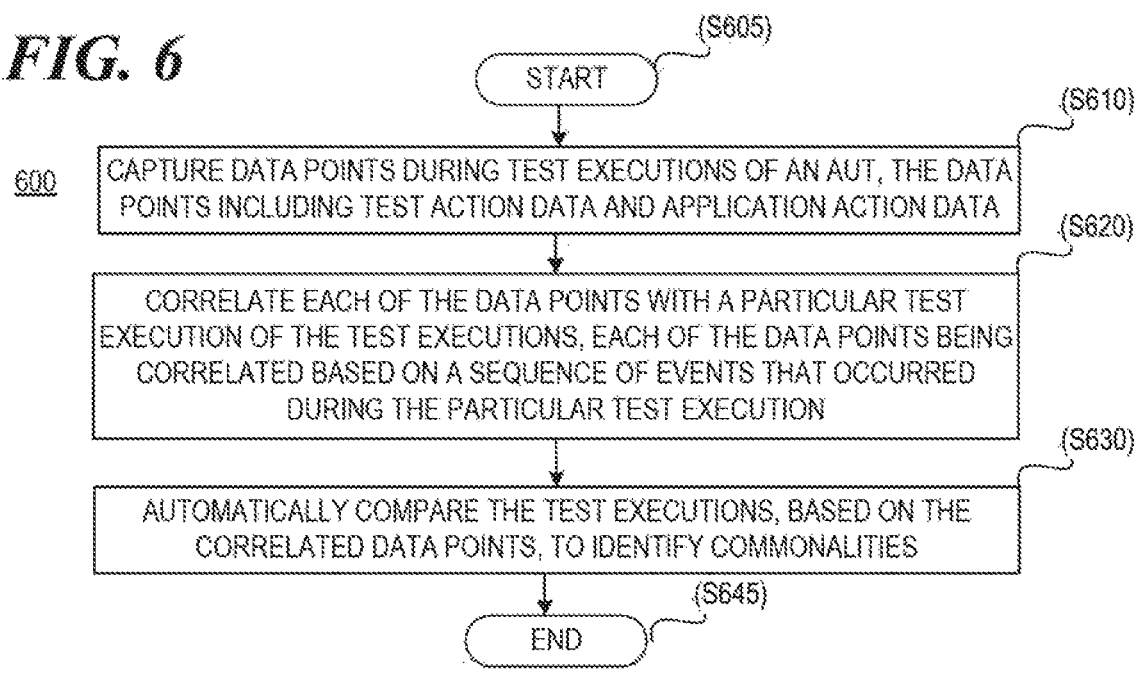
FIG. 6 is a flow chart of an example process for test execution comparisons consistent with disclosed implementations.

Furthermore, as shown in FIG. 5, each test step in DAG 500 has additional information that was captured from the testing and/or application environment and was correlated with the particular test step. This additional information (e.g. metadata) has been assigned as vertices (only vertices 520*b*, 520*c*, 520*d*, 520*e*, and 520*f* have been labelled for clarity) connected to the backbone. For example, test step 520*a* relates to opening a browser. In this case, the step of opening the browser included using the browser (an object) and it was used with a specific action (in this case open). Thus, during this particular test execution state the browser was automatically opened by calling the open function of the browser. This information is modelled in DAG 500 not simply by linking the test actions and what follows in terms of the AUT and its environment, but also by the tags that indicate the conceptual meaning of those steps. Each test action and the linking of the actions that follow in response to the test action in terms of the AUT and its environment may be considered to be a node chain of the DAG. Thus, in some implementations, there may be a node chain for each test action performed during the test execution, FIG. 6 is a flow chart of an example process 600 for test execution comparisons consistent with disclosed implementations. Although execution of process 600 is described below with reference to test execution comparison device 310 of FIG. 3, specific components of test execution comparison device 310, and/or system 100 of FIG. 1 other suitable systems and devices for execution of at least one step of process 800 may be used. For example, processes described below as being performed by test execution comparison device 310 may be performed by test execution comparison device 110, test execution comparison device 210, and/or any other suitable device. Process 600 may be implemented in the form of executable instructions stored on a machine-readable storage medium and/or in the form of electronic circuitry.

Process 600 may start (step S605) before or during a test execution of an AUT. As shown in FIG. 6, process 800 may include capturing data points during test executions of an AUT (step S610). For example, data capture engine 320 of test execution comparison device 310 may capture data points during test executions of an AUT. In some implementations, the data points may include test action data and application action data. For example, data capture engine 320 may capture data points during the test using the methods described (e.g., by installing agents on various physical or virtual system components to monitor how the particular components) function and to transmit the data points to a storage device, such as repository 130).

Process 800 may also include correlating each of the data points with a particular test, execution of the test executions (step S620). For example, data correlation engine 330 of test execution comparison device 310 may correlate each of the data points with a particular test executions of the test executions. In some implementations, each of the data points may be correlated based on a sequence of events that occurred during the particular test execution. For example, data correlation engine 330 may correlate each of the data points using the methods described above. For example, in some implementations, the data correlation engine may correlate each of the data points by generating DAGs for the test executions, where each of the DAGs includes a set of backbone nodes and a set of data nodes connected to the set of backbone nodes. For example, the DAGs could be generated in a manner the same as similar to that described above with respect to, for example, FIG. 5.

Process 600 may also include automatically comparing the test executions, based on the correlated data points, to identify commonalities (step S630). For example, test execution comparison engine 340 of test execution comparison device 310 may automatically compare the test executions to identify the commonalities. In some implementations, test execution comparison engine 340 may automatically compare the test executions by generating string representations of each of the DAGs (e.g., each of the DAGs generated by data correlation engine 330 that are being used for comparison). As used herein, a string representation of a DAG may be considered to be a sequence of characters representing the DAG.

In some implementations, data correlation engine may generate the string representations of each of the DAGs by generating string representations for each of the set of backbone nodes (e.g., each backbone node of each DAG). For example, the string representation may include information related to connected data nodes of the set of data nodes and may be based on data node type and data node attributes of the connected data nodes. For example, test execution comparison device 310 may query a correlated data structure, such as correlated data points 131 stored in repository 130, to retrieve a set of data nodes connected to a particular backbone node ordered by data node type and by timestamp. For each retrieved data node, test execution comparison engine 340 may generate a string representation of the data node using a hash function for that particular node type. The hash function can be used to fix the size of the string representation, and the hash function may be different for each node type. For example, in some implementations, the hash function may be used to reduce the data length for later comparison, as well as to create a uniform basis for that comparison. In some implementations, the hash function may iterate the data node-attributes, (e.g., DAG metadata), determine which data node attributes are significant, and minimize each significant data node attributes to a fixed string size. These fixed size strings may be joined as the string representation of the data node.

In some implementations, if two data nodes have the same type and the same significant attributes with the same or similar values, then their string representations should be the same or similar. Take, for example, a data node type of "HTTP request" which may have the attributes of timestamp, HTTP verb, target URL, headers, and body. A similar HTTP request will have the same HTTP verb, target URL, and headers, but the timestamp will likely be different and the body will likely vary to some extent. Thus, the HTTP verb, target URL, and headers may be considered to be significant data node attributes, and the string representation may include a hashed version of the HTTP verb, target URL, and headers.

In some implementations, data correlation engine may generate the string representations of each of the DAGs by concatenating the string representations based on an order of the set of backbone nodes. For example, the string representations of each of the data nodes may be joined together based on timestamps associated with the data nodes (e.g., in sequential order) to create a string representation for the backbone node. Furthermore, each of the backbone node string representations related to a particular DAG may also be joined together based on timestamps associated with the backbone nodes (e.g., in sequential order).

In some implementations, step S630 may also include identifying a longest common subsequence of the string representations. For example, test execution comparison engine 340 of test execution comparison device 310 may identify the longest common subsequence by determining sets of matching character strings and selecting the matching character string that has the most characters.

In some implementations, step S630 may include determining a level of similarity between the test executions based on the longest common subsequence. For example, test execution comparison engine 340 of test execution comparison device 310 may calculate a similarity value based on a comparison of a length of the longest common subsequence to a length of each of the string representations, and comparing the similarity value to a threshold value. In some implementations, the comparison may be a ratio between the length of the longest common subsequence and the length of the string representation. For example, if the ratio exceeds the threshold value, the test executions may be considered similar. While in this example, determining the level of similarity is performed between test executions, the level of similarity may also be determined within test executions themselves using techniques similar to that described above. For example, the level of similarity may be calculated for a single node rather than a number of nodes in a DAG.

In some implementations, step S630 may include mapping the longest common subsequence back to a subset of backbone nodes in the set of backbone nodes. For example, test execution comparison angina 340 of test execution comparison, device 310 may compare the longest common subsequence with the generated string representations, and may use the location of the longest common subsequence within the string representation to derive the correlated backbone nodes in the DAG of the test execution.

In some implementations, step S630 may include causing the generation of a visualization of the test executions. For example, test execution comparison engine 340 of test execution comparison device 310 may cause the listing of, for each of the directed acyclic graphs, a sequence of the set of backbone nodes. The listing may be text, graphics, and/or a combination of text and graphics that includes information related to the backbone node string representations, such as the backbone node type and/or corresponding data nodes. In some implementations, the Information may be listed in the sequence in which it was gathered such that backbone nodes corresponding to test steps are listed in the order in which the test steps were performed. As another example, test execution comparison engine 340 may cause the highlighting of, for each of the directed acyclic graphs, the subset of backbone nodes. For example, the subset of backbone nodes that are mapped to the longest common subsequence may be displayed in a different color than backbone nodes that are not mapped to the longest common subsequence. As another example, test execution comparison engine 340 may cause the generation of the visualization by causing the visual alignment of a display of each of the directed acyclic graphs that correspond with the longest common subsequence. The visual alignment of the display may include collapsing nodes that are not in the highlighted subset of backbone nodes and displaying summary information for the collapsed nodes. Examples of visualizations consistent with disclosed implementations are described in further detail below with respect to, for example, FIGS. 9-11. Once steps S610, S620, and/or S630 are complete, process 600 may end (step S645).

Figure 7:
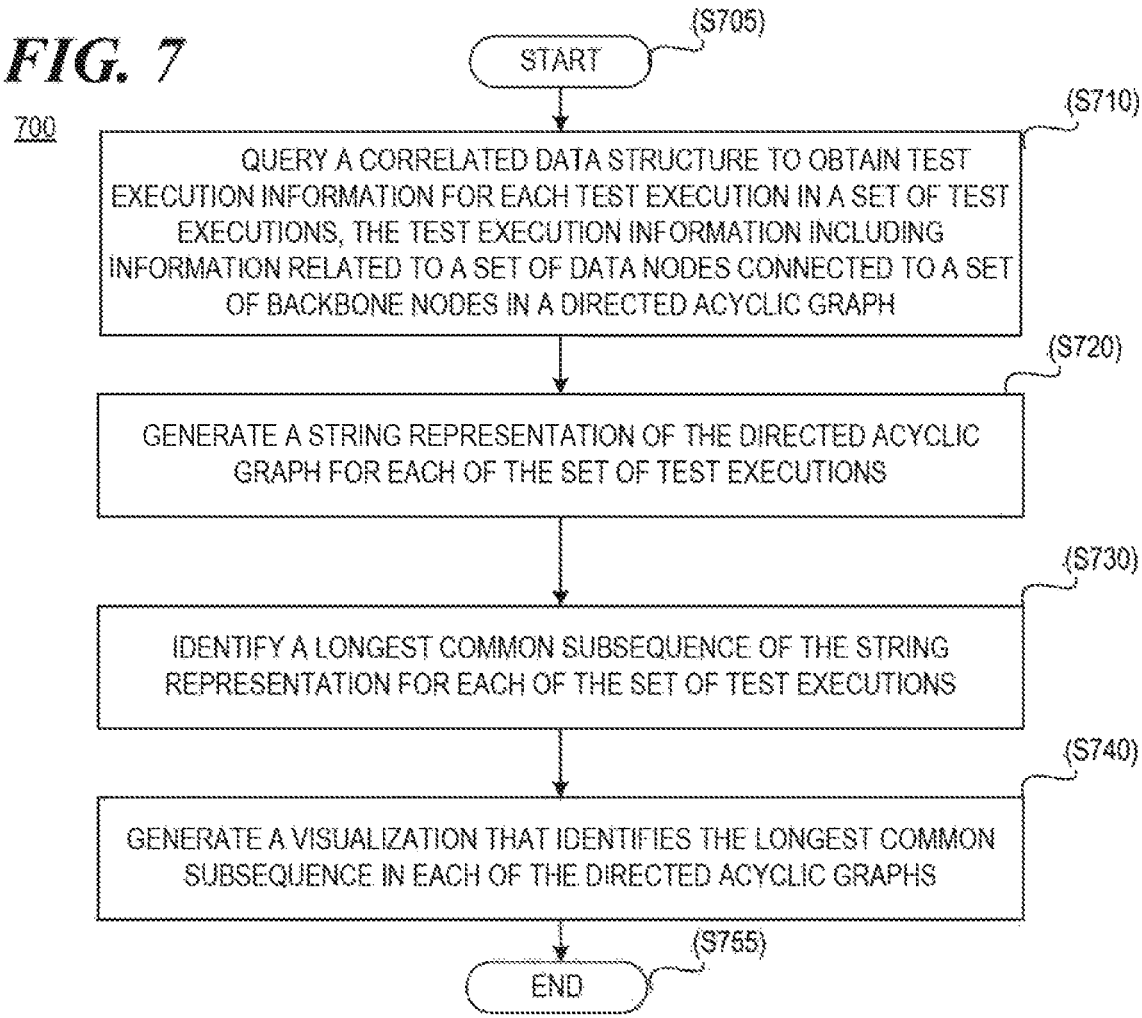
FIG. 7 is a flow chart of an example process for test execution comparisons consistent with disclosed implementations.

FIG. 7 is a flow chart, of an example process 700 for test execution comparisons consistent with disclosed implementations. Although execution of process 700 is described below with reference to test execution comparison device 310 of FIG. 3, specific components of test execution comparison device 310, and/or system 100 of FIG. 1, other suitable systems and devices for execution of at least one step of process 700 may be used. For example, processes described below as being performed by test execution comparison device 310 may be performed by test execution comparison device 110, test execution comparison device 210, and/or any other suitable device. Process 700 may be implemented in the form of executable instructions stored on a machine-readable storage medium and/or in the form of electronic circuitry.

Process 700 may start (step S705) after data points have been captured and correlated into a correlated data structure (e.g., a DAG) using, for example, the methods described above. Process 700 may include querying a correlated data structure to obtain test execution information for each test execution in a set of test executions (step S710). In some implementations, the test execution information may include information related to a set of data nodes connected to a set of backbone nodes in a DAG. For example, the set of backbone nodes may correspond to user actions performed during historical test executions of an application under test and the set of data nodes may correspond to application actions performed in response to user actions, in some implementations, test execution comparison engine 340 of test execution comparison device 310 may query repository 130 to obtain test execution information related to correlated data points 131. As another example, the set of backbone nodes may correspond to user actions performed during historical test executions of an application under test and the set of data nodes correspond to application actions performed in response to user actions. In some implementations, the test execution information may include backbone node type, metadata associated with the backbone node, data node type, metadata associated with the data node, relationship information indicating relationships between backbone node(s) and/or data node(s), and/or any other suitable test execution information. In some implementations, the test execution information may be text that is ordered by node type and/or by timestamp. For example, text related to the backbone nodes may be ordered based on timestamp, and text related to data nodes correlated with a particular backbone node may be placed between the text relating to fie particular backbone node and a subsequent backbone node.

Process 700 may also include generating a string representation of the DAG for each of the set of test executions (step S720), identifying a longest common subsequence of the string representation for each of the set of test executions (step S730), and/or generating a visualization that identifies the longest common subsequence in each of the DAGs (step S740). For example, test execution comparison engine 340 may generate a string representation, identify a longest common subsequence, and generate a visualization using the methods described above. In some implementations, the siring representation may be generated based on the data node type and data node attributes. For example, each data node type may have a different hash function, and test execution comparison engine 340 may generate a string representation of each data node using that particular node type's hash function. In some implementations, generating the visualization may include: displaying a subset of the set of backbone nodes that correspond with the longest common subsequence; and displaying, between nodes within the subset, information related to data nodes in the set of data nodes that are not within the subset. For example, test execution comparison engine 340 may collapse data nodes that are not significant and display Information related to the collapsed nodes. Once steps S710, S720, S730, and/or S740 are complete, process 700 may end (step S755).

Figure 8:
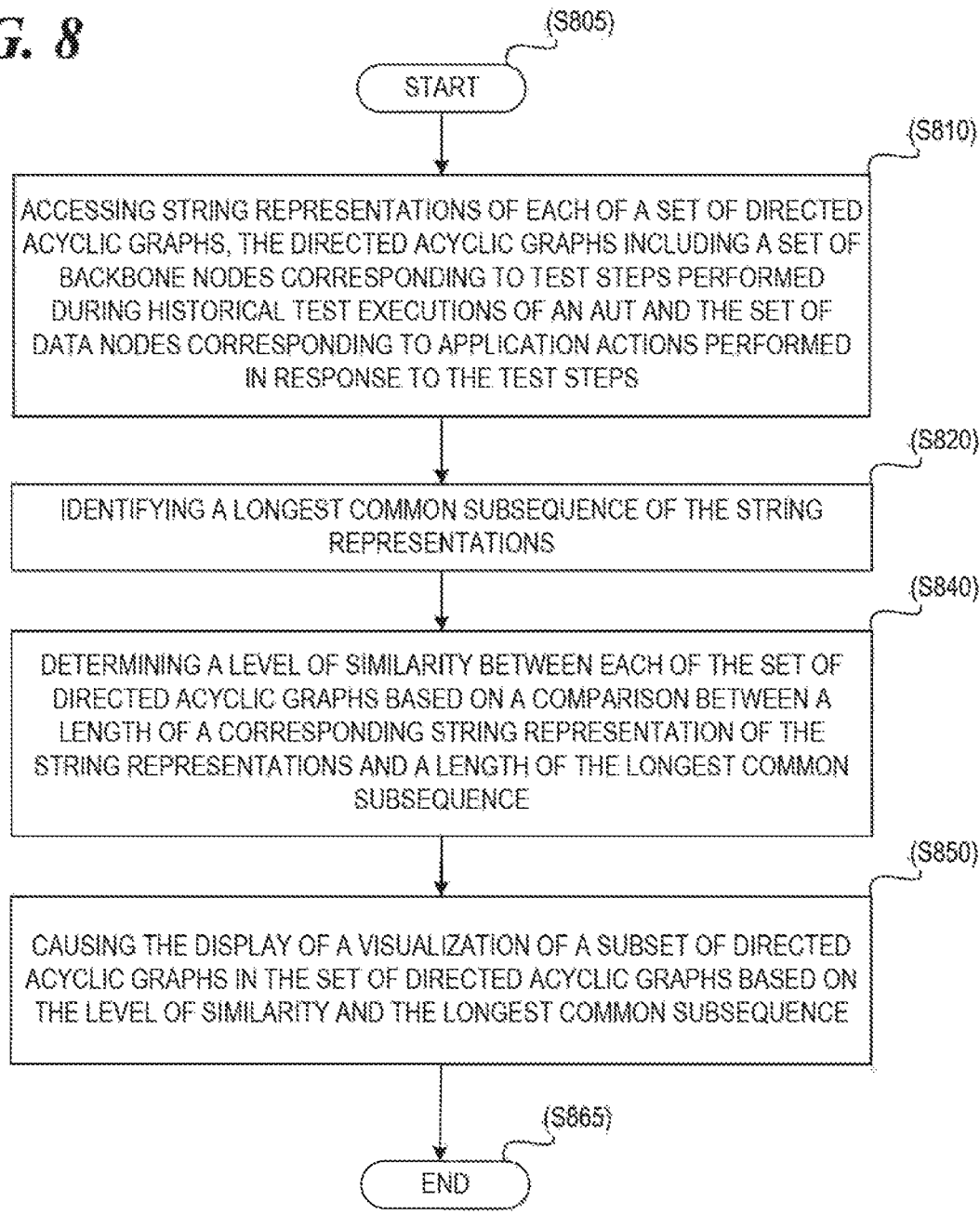
FIG. 8 is a flow chart of an example process for test execution comparisons consistent with disclosed implementations.

FIG. 8 is a flow chart of an example process 800 for test execution comparisons consistent with disclosed implementations. Although execution of process 800 is described below with reference to test execution comparison device 310 of FIG. 3, specific components of test execution comparison device 310, and/or system 100 of FIG. 1, other suitable systems and devices for execution of at least one step of process 800 may be used. For example, processes described below as being performed by test execution comparison device 310 may be performed by test execution comparison device 110, test execution comparison device 210, and/or any other suitable device. Process 800 may be implemented in the form of executable instructions stored on a machine-readable storage medium and/or in the form of electronic circuitry.

Process 800 may start (step S805) after data points have been captured and correlated into a correlated data structure (e.g., a DAG) using, for example, the methods described above. In some implementations, process 800 may start after string representations of elements of the correlated data structure have been created. Process 800 may include accessing string representations of each of a set of DAGs (step S810). For example, test execution comparison engine 340 may access string representations stored in a storage device (such as repository 130), may receive the string representations from another components, and/or obtain the string representations in any suitable manner, in some implementations, the DAGs may include a set of backbone nodes corresponding to test steps performed during historical test executions of an application under test and the set of data nodes may correspond to application actions performed in response to the test steps.

Process 800 may also include identifying a longest common subsequence of the string representations (step S820). For example, test execution comparison engine 340 may identify a longest common subsequence using the methods described above.

Process 800 may also include determining a level of similarity between each of the set of directed acyclic graphs based on a comparison between a length of a corresponding string representation of the the string representations and a length of the longest common subsequence (step S830). In some implementations, test execution comparison engine 340 may determine the similarity value by calculating a ratio between the length of the string representation and the length of the longest common subsequence. For example, test execution comparison engine 340 may calculate the ratio using the methods described above. Additionally, in some examples the similarity value may be compared to a threshold value. The comparison may be the same or similar to the comparison describe above.

Process 800 may also include causing the display of a visualization of a subset of DAGs in the set of DAGs based on the level of similarity and the longest common subsequence. For example, the visualization may be limited to the subset of DAGs. In some implementations, causing the display of the visualization comprises visually aligning a display of each of the DAGs in the set of DAGs that correspond with the longest common subsequence. For example, the DAGs may be aligned such that similar nodes are aligned horizontally and/or vertically. Examples of causing the display of a visualization are shown in greater detail in, for example, FIGS. 9-11. Once steps S810, S820, S830, and/or S840 are complete, process 800 may end (step S865).

Figure 9:
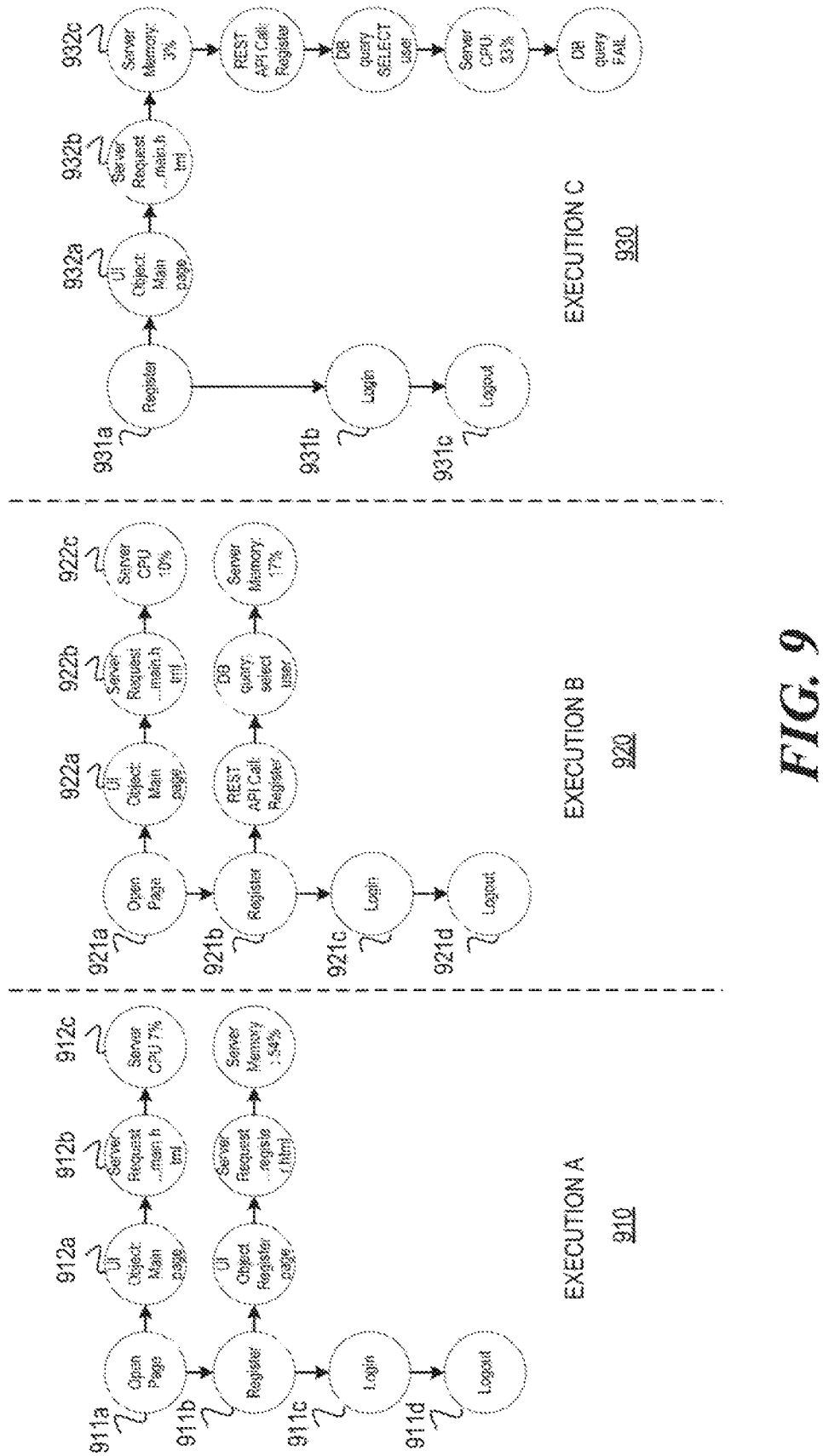
FIG. 9 is an example illustration of correlated backbone nodes and data nodes consistent with disclosed implementations.

FIG. 9 is an example illustration of correlated backbone nodes and data nodes consistent with disclosed implementations. In the example shown in FIG. 9, information corresponding to the illustrated backbone nodes and data codes may have been captured and correlated using methods consistent with those described above. As shown in FIG. 9, illustrations related to three text executions (e.g., three DAGs) are shown: "Execution A" 910; "Execution 8" 920; and "Execution C" 930, in some implementations, test execution comparison device 310 may cause the display of interfaces 1000, 1100 on a display device.

As shown in FIG. 9, the illustration includes graphical representations of a plurality of example backbone nodes (911a, 911b, 911c, 911d for Execution A 910; 921a, 921b, 921c, 921d for Execution B 920; and 931a, 931b, and 931c for Execution C930). These backbone nodes may correspond to test steps performed during a particular test execution of the AUT. For example, the backbone nodes may correspond to user interactions with the AUT during the test. As shown in FIG. 9, the test steps include "Open Page," (e.g., 911a, 921a) "Register," (911b, 921b, 931a) "Login," (911c, 921c, 931b) and "Logout" (911d, 921d, 931c). In addition to backbone nodes, the illustration includes graphical representations of a plurality of example data nodes that correspond to backbone nodes 911a-d, 921a-d, and 931a-c. For example, the "Open Page" step 912a resulted in a plurality of corresponding application behaviors, which may have been recorded by a device such as test execution comparison device 310 (e.g., "UI Object Main page" 912a, Server Request . . . main.html" 912b, and "Server CPU 7%" 912c). Other nodes in FIG. 9 may similarly also have corresponding data nodes (e.g., nodes 922a, 922b, 922c in Execution B 920 and nodes 932a, 932b, and 932c in Execution C 930). Examples of visualizations of comparison between the correlated backbone nodes and data nodes of FIG. 9 are shown in FIGS. 10 and/or 11.

Figure 10:
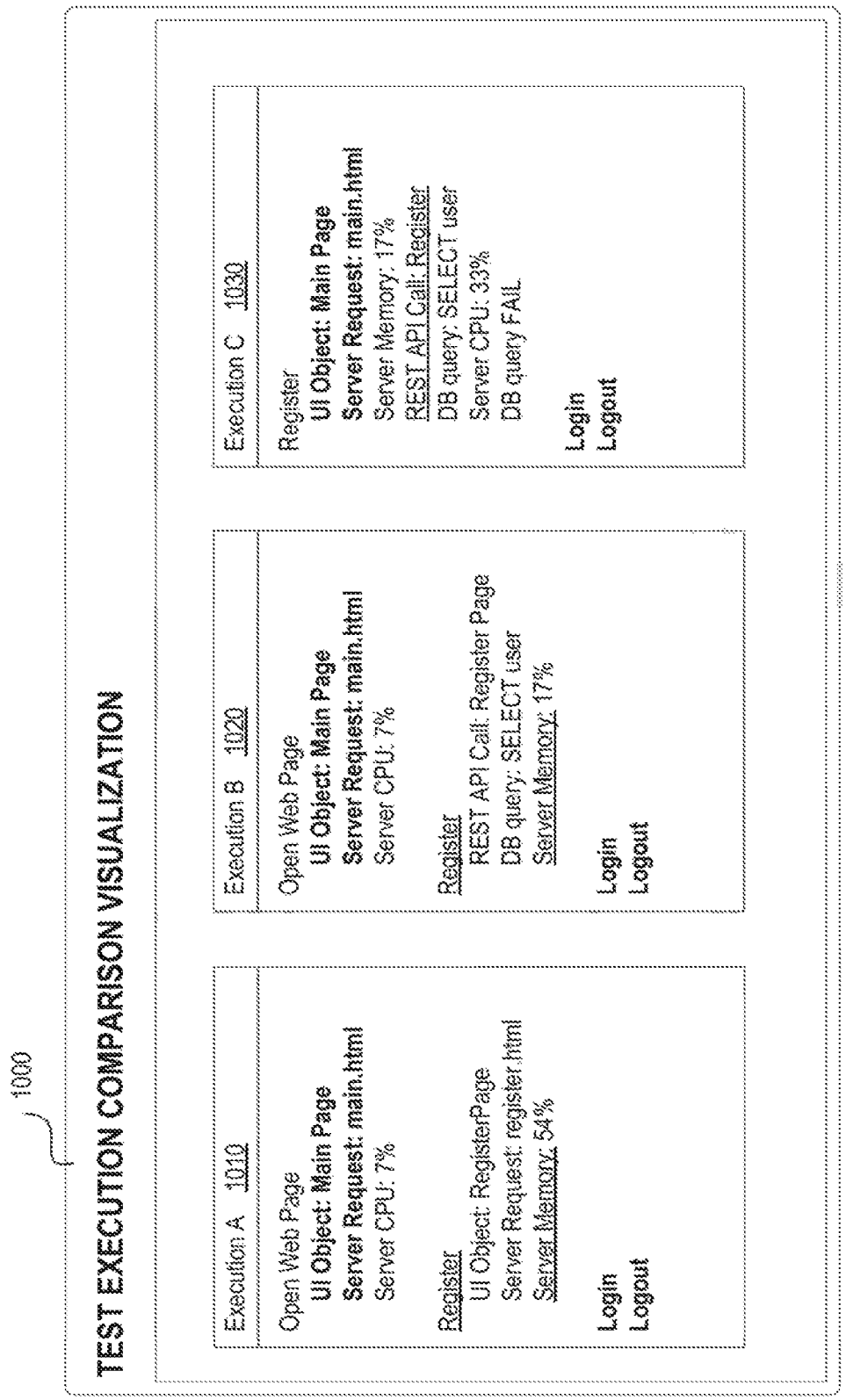
FIG. 10 is an example illustration of a test execution comparison visualization consistent with disclosed implementations.

FIG. 10 is an example illustration of a test execution comparison visualization 1000 consistent with disclosed implementations. Information used to generate test execution comparison visualization 1000 may be similar to or the same as the information used in FIG. 9. As shown in FIG. 10, visualization 1000 may include a display of information related to each of the test executions. For example, visualization 1000 may include a listing of, for each test execution (e.g., each DAG), a sequence of a set of nodes (e.g., backbone nodes and/or data nodes). For example, Execution A 1010 in FIG. 10 shows a listing of "Open Web Page," "Register", "Login," and "Logout." In some implementations, visualization 1000 may highlight, for each test execution (e.g., each DAG), a subset of the set of nodes. For example, visualization 1000 may highlight a subset of nodes that correspond to and/or otherwise identifies the longest common subsequence. In this particular example, the common backbone nodes that are part of the longest common subsequence are "Open Web Page", "Register," "Login," and "Logout." Note that in this example, while "Open Web Page" and "Register" are different test steps, they resulted in similar application actions and are thus considered to be similar and part of the longest common subsequence. Furthermore, the "Open Web Page" in execution A may be considered to be similar to both the "Open Web Page" In execution B, as well as "Register" in Execution C.

While in the example shown in FIG. 10, the subset of nodes is highlighted by holding the text associated with the particular node (e.g., "UI Object: Main Page," "Server Request: main.html", "Login," and "Logout" in the display related to Execution A 1010), any suitable type of highlighting may be used (e.g., text, graphics, and/or a combination of text and graphics). Additionally, in some implementations, partial set subsequences may also be highlighted. For example, "Register" as a backbone node and "Server Memory" as a data node is shown in Execution A 1010 and Execution B 1020, but not in Execution C 1030, and is highlighted by underlining.

In some implementations, a test execution comparison device (e.g., device 110, 210, and/or 310) may cause the display of the listing of the sequence of backbone nodes such that nodes corresponding to the longest common subsequence are located at similar horizontal and/or vertical locations on visualization 1000. For example, the test step of "Open Web Page" in Execution A 1010 may be a first test step while the test step of "Open Web Page" in Execution B 1020 may be a fifteenth test step. While these test steps were performed during different points in a test, they are aligned horizontally in FIG. 10, and information related to test steps that are not part of the longest common subsequence is removed.

Figure 11:
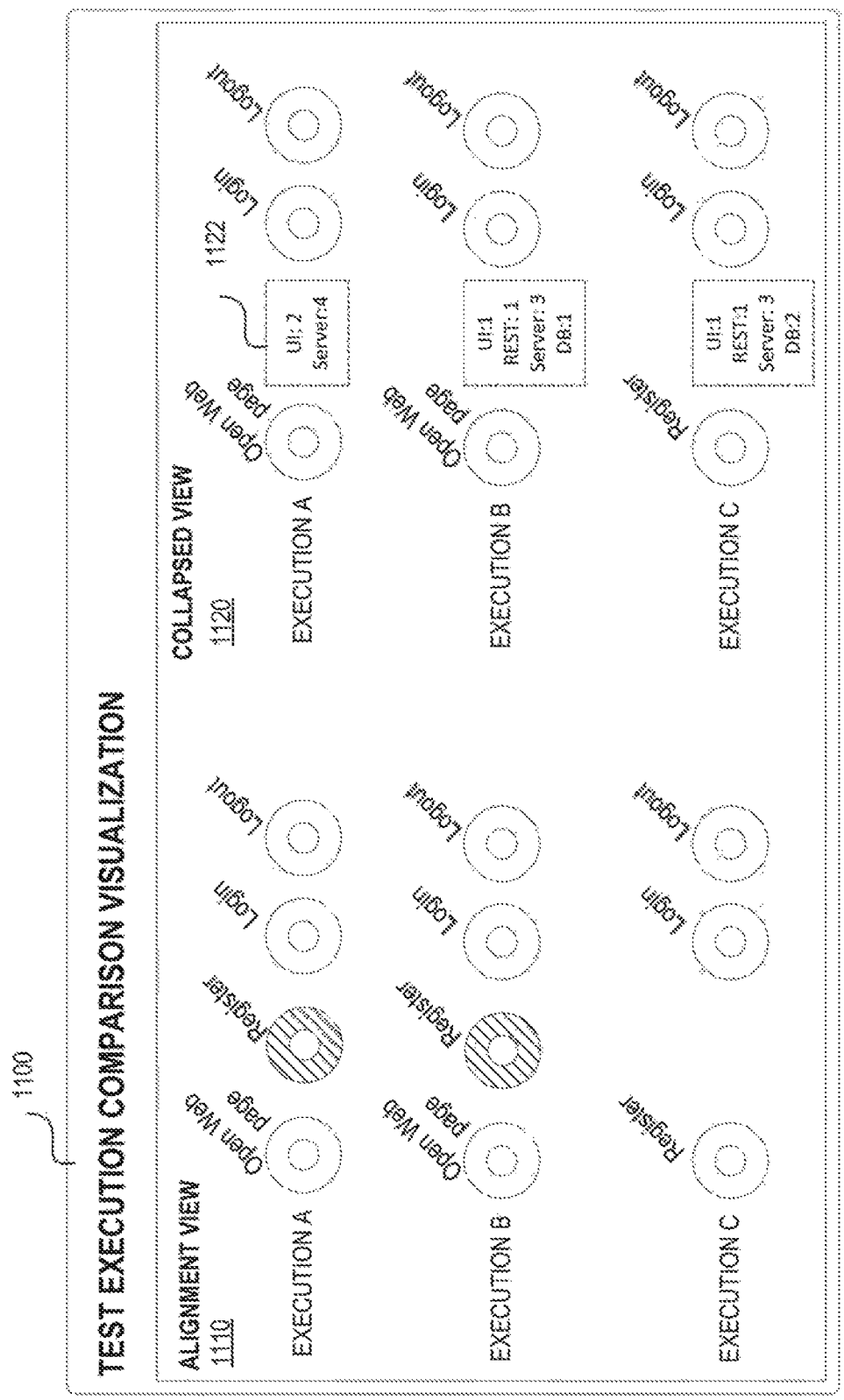
FIG. 11 is an example illustration of test execution comparison visualization consistent with disclosed implementations.

FIG. 11 is an example illustration of a test execution comparison visualization 1000 consistent with disclosed implementations. Information used to generate test execution comparison visualization 1000 may be similar to or the same as the information used in FIGS. 9 and/or 10. As shown in FIG. 11, visualization 1100 may include two types of views; alignment view 1110 and collapsed view 1120. Alignment view 1110 may include graphics and/or text representing a subset of backbone nodes that correspond with the longest common subsequence, as well as backbone nodes (e.g., test steps) that occurred between nodes within the subset. As shown in FIG. 11, nodes that are part of the longest common subsequence may be displayed differently than nodes that are not part of the longest common subsequence. For example, in alignment view 1110, the "Register" nodes in Execution A and Execution B are highlighted by being displayed differently than other nodes within those executions that are part of the longest common subsequence. Additionally, in some examples, the subset of backbone nodes may be visually aligned such that similar nodes are located on the same horizontal and/or vertical axes. For example, while there are only three backbone nodes displayed related to Execution C, the "Login" and "Logout" graphics are aligned vertically to represent similar steps.

Collapsed view 1120 may display summary information for collapsed nodes that are not in the highlighted set of backbone nodes. For example, the summary information may be related to data nodes corresponding to backbone nodes that, are part of the longest common subsequence, as well as data nodes that are part of intervening backbone nodes that are not part of the longest common subsequence. In the example shown in FIG. 11, Execution A had two UI events and 4 server events between the "Open Web Page" and "Login" steps, Execution B had 1 UI event, 1 REST event, 3 server events, and 1 DB event between the "Open Web Page" and "Login" steps, and Execution G, in response to the Register backbone node, included one UI event, one REST event, 3 server events, and two DB events. Thus, in this example, backbone nodes and data nodes between nodes that match the longest common subsequence may be collapsed.

While FIGS. 10 and 11 show specific examples of test execution comparison visualizations, any suitable test execution comparison visualization may be used. For example, visualizations consistent with disclosed examples may use any combination of text and/or graphics Illustrate similarities and/or differences between test executions.

The disclosed examples may include systems, devices, machine-readable storage media, and methods for test execution comparisons. For purposes of explanation, certain examples are described with reference to the components illustrated in FIGS. 1-11, The functionality of the illustrated components may ovarlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms, instead, these terms are used to distinguish one element from another.

Further, the sequence of operations described in connection with FIGS. 1-11 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-11. Thus, the present disclosure merely sets forth possible examples of Implementations, and many variations and modifications may be made to the described examples. All such modifications and variations are intended to be included within the scope of this disclosure and protected by the following claims.

We claim:

1. A system comprising:
   a processor; and
   a memory to store instructions that, when executed by the processor, cause the processor to:
   capture first data points during a plurality of test executions of an application under test, the first data points including test action data and application action data;

correlate each first data point of the first data points with a particular test execution of the plurality of test executions to provide correlated data points, wherein the correlation comprises correlating the each first data point-based on a sequence of events that occurred during the particular test execution; and automatically compare the plurality of test executions, based on the correlated data points, to identify commonalities, wherein the comparison comprises:
  categorizing each correlated data point of the correlated data points into at least one type of a plurality of types to provide categorized data points, the at least one type including a first type;
  assigning the correlated data points categorized as the first type as backbone nodes of a first directed acyclic graph; and
  connecting remaining data points of the categorized data points as data nodes to the backbone nodes via directed edges based on timestamps associated with the remaining data points, the remaining data points being a set of the categorized data points not categorized as the first type.

2. The system of claim 1, wherein the instructions, when executed by the processor, further cause the processor to assign metadata as vertices connected to the backbone nodes; and
  assign tags to the directed edges to identify relations between the vertices.

3. The system of claim 1, wherein the instructions, when executed by the processor, further cause the processor to generate a plurality of directed acyclic graphs for the plurality of test executions, wherein the first directed acyclic graph is part of the plurality of directed acyclic graphs, and each directed acyclic graph of the plurality of directed acyclic graphs includes a set of backbone nodes and a set of data nodes connected to the set of backbone nodes.

4. The system of claim 3, wherein the instructions, when executed by the processor, further cause the processor to:
  generate a plurality of string representations, wherein each string representation of the plurality of string representations corresponds to a-directed acyclic graph of the plurality of directed acyclic graphs;
  identify a longest common subsequence of the plurality of string representations;
  determine a level of similarity between the plurality of test executions based on the longest common subsequence; and
  map the longest common subsequence back to a subset of backbone nodes in the sets of backbone nodes.

5. The system of claim 4, wherein the instructions, when executed by processor, further causes the processor to:
  generate a set of string representations of the plurality of string representations for each set of backbone nodes of the sets of backbone nodes; and
  concatenate the sets of string representations based on orders of the sets of backbone nodes.

6. The system of claim 4, wherein the instructions, when executed by the processor, further cause the processor to
  calculate a similarity value based on a comparison of a length of the longest common subsequence to a length of each string representation of the plurality of string representations; and
  compare the similarity value to a threshold value to determine the level of similarity.

7. The system of claim 4, wherein the instructions, when executed by the processor, further cause the processor to generate data to cause a visualization of the plurality of test executions, wherein the generation of the data comprises:
  providing data to cause a listing of, for each directed acyclic graph of the plurality of directed acyclic graphs, a sequence of the set of backbone nodes of the each directed acyclic graph;
  providing data to cause a highlighting of, for each directed acyclic graph of the plurality of directed acyclic graphs, the subset of backbone nodes of the each directed acyclic graph to provide a highlighted subset of backbone nodes for the each directed acyclic graph; and
  providing data to cause a visual alignment of a display of each directed acyclic graph of the plurality of directed acyclic graphs that correspond with the longest common subsequence.

8. The system of claim 7, wherein providing the data to cause the visual alignment comprises:
  collapsing nodes of the each directed acyclic graph that corresponds with the longest common subsequence and are not in the highlighted subset of backbone nodes of the each directed acyclic graph that corresponds with the longest common subsequence to provide collapsed nodes; and
  providing data to display summary information for the collapsed nodes.

9. A non-transitory machine-readable storage medium including instructions which, when executed by a processor, cause the processor to:
  access data representing first data points captured during a plurality of test executions of an application under test, wherein the first data points include test action data and application action data;
  correlate each first data point of the first data points with a particular test execution of the plurality of test executions to provide correlated data points, wherein the correlation comprises correlating the each first data point based on a sequence of events that occurred during the particular test execution;
  compare the plurality of test executions, based on the correlated data points, to identify commonalities, wherein the comparison comprises:
    categorizing each correlated data point of the correlated data points into at least one type of a plurality of types to provide categorized data points, the at least one type including a first type;
    assigning the correlated data points categorized as the first type as backbone nodes of a first directed acyclic graph; and
    connecting remaining data points of the categorized data points as data nodes to the backbone nodes via directed edges based on timestamps associated with the remaining data points, the remaining data points being a set of the categorized data points not categorized as the first type; and
  generate data to provide a visualization of the first directed acyclic graph.

10. The non-transitory machine-readable storage medium of claim 9, wherein the backbone nodes correspond to user actions performed during historical test executions of the application under test, and the data nodes correspond to application actions performed in response to the user actions.

11. The non-transitory machine-readable storage medium of claim 9, wherein the instructions, when executed by the processor, further cause the processor to generate a string representation of the first directed acyclic graph based on a data node type and data node attributes.

12. The non-transitory machine-readable storage medium of claim 9, wherein the instructions, when executed by the processor, further cause the processor to:
- assign metadata as vertices connected to the backbone nodes; and
- assign tags to the directed edges to identify relations between the vertices.

13. A computer-implemented method comprising:
- accessing data representing first data points captured during a plurality of test executions of an application under test, wherein the first data points include test action data and application action data;
- correlate each first data point of the first data points with a particular test execution of the plurality of test executions to provide correlated data points, wherein the correlation comprises correlating the each first data point based on a sequence of events that occurred during the particular test execution;
- comparing the plurality of test executions, based on the correlated data points, to identify commonalities, wherein the comparison comprises:
  - categorizing each correlated data point of the correlated data points into at least one type of a plurality of types to provide categorized data points, the at least one type including a first type;
  - assigning the correlated data points categorized as the first type as backbone nodes of a first directed acyclic graph; and
  - connecting remaining data points of the categorized data points as data nodes to the backbone nodes via directed edges based on timestamps associated with the remaining data points, the remaining data points being a set of the categorized data points not categorized as the first type; and
- generating data to provide a visualization of the first directed acyclic graph.

14. The computer-implemented method of claim 13, further comprising generating a plurality of directed acyclic graphs for the plurality of test executions, wherein the first directed acyclic graph is part of the plurality of directed acyclic graphs, and each directed acyclic graph of the plurality of directed acyclic graphs includes a set of backbone nodes and a set of data nodes connected to the set of backbone nodes.

15. The computer-implemented method of claim 14, further comprising:
- generating a plurality of string representations, wherein each string representation of the plurality of string representations corresponds to a directed acyclic graph of the plurality of directed acyclic graphs;
- identifying a longest common subsequence of the plurality of string representations;
- determining a level of similarity between the plurality of test executions based on the longest common subsequence; and
- mapping the longest common subsequence back to a subset of backbone nodes in the sets of backbone nodes.

* * * * *